No. 897,472. PATENTED SEPT. 1, 1908.
J. MARX.
JAR FOR STORAGE BATTERIES.
APPLICATION FILED JULY 19, 1907.
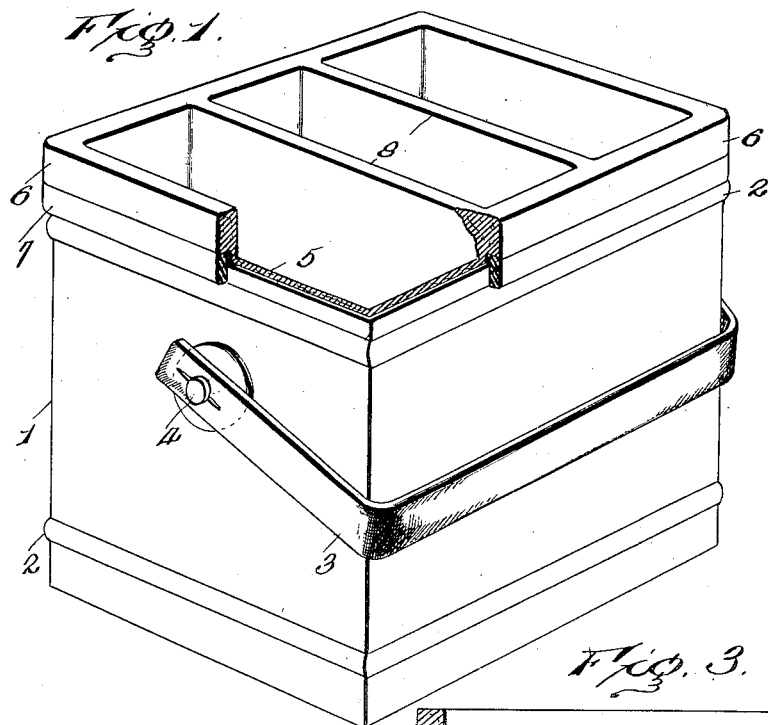
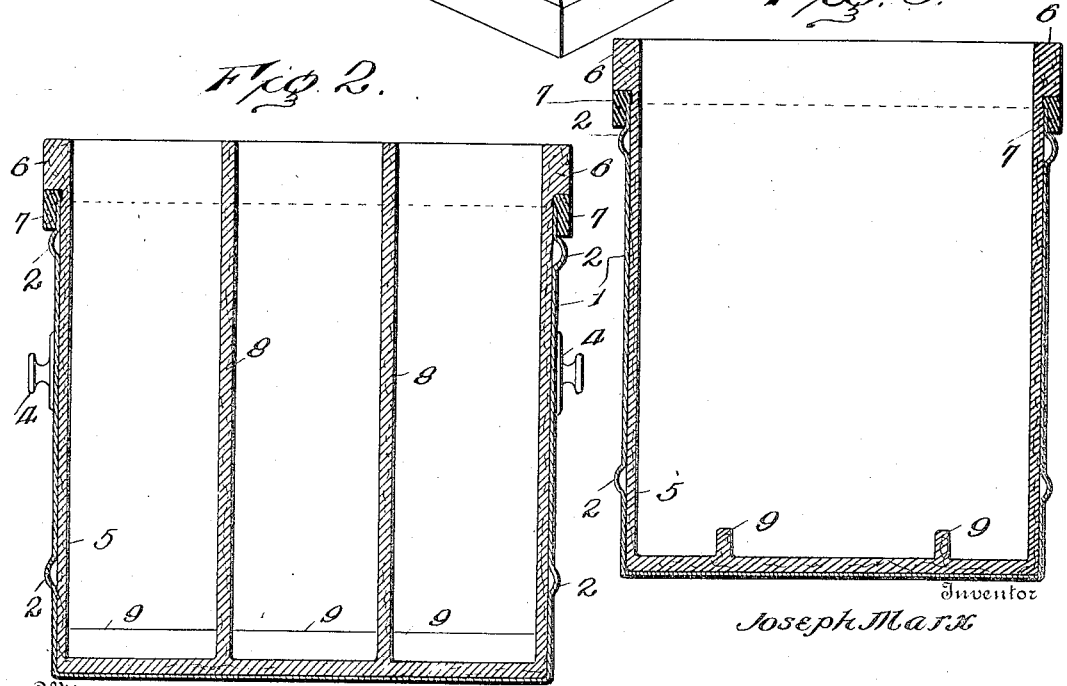

UNITED STATES PATENT OFFICE.

JOSEPH MARX, OF BUFFALO, NEW YORK.

JAR FOR STORAGE BATTERIES.

No. 897,472.　　　　Specification of Letters Patent.　　　Patented Sept. 1, 1908.

Application filed July 19, 1907. Serial No. 384,580.

*To all whom it may concern:*

Be it known that I, JOSEPH MARX, citizen of the United States, residing at Buffalo, in the county of Erie and State of New York, have invented certain new and useful Improvements in Jars for Storage Batteries, of which the following is a specification.

The present invention contemplates certain new and useful improvements in the construction of jars for storage batteries and the like, and aims to provide a novel jar of this character which is peculiarly formed so as to effectively retain the acid and prevent it from coming into contact with the metallic portions of the jar.

The object of the invention is to provide a jar for storage batteries which is of simple and durable construction and can be readily transported from place to place.

For a full description of the invention and the merits thereof and also to acquire a knowledge of the details of construction and the means for effecting the result, reference is to be had to the following description and accompanying drawings, in which:

Figure 1 is a perspective view of a jar embodying the invention, portions being broken away. Fig. 2 is a longitudinal sectional view through the jar. Fig. 3 is a transverse sectional view through the same.

Corresponding and like parts are referred to in the following description and indicated in all the views of the drawings by the same reference characters.

In its broadest phase the invention comprises a jar formed with an inner shell of hard rubber or other similar material adapted to resist the action of the acid within the battery, and an outer metallic shell designed to receive the inner shell and form a protective casing for the same.

The outer shell indicated at 1 may be provided with the outwardly pressed reinforcing ribs 2 and has a handle 3 applied thereto by means of which the battery can be readily carried from place to place. In the present instance this handle 3 is in the nature of a leather strap the ends of which detachably engage studs or buttons 4 upon opposite sides of the jar. The inner shell 5 fits closely within the outer shell 1 and extends upwardly above the same, the outer edge of the inner shell being formed with an annular enlargement or rim 6 which reinforces the mouth of the shell and carries a downwardly extending lip 7 fitting over and embracing the edge of the outer shell 1. In the present instance this lip 7 is shown as formed of some yielding material such as soft rubber which is vulcanized to the rim 6. This manner of forming the lip has the advantage of enabling the same to yield and accommodate itself to slight changes of shape in the outer shell 1 and at the same time always producing a close joint between the two members which effectively prevents any acid from working between the same. The inner shell 5 is subdivided into a plurality of compartments by the partitions 8 and transversely disposed ribs or bridges 9 project upwardly from the bottom of the various compartments. These bridges 9 serve to support the battery plates in an elevated position and prevent the same from resting upon the bottom of the jar. It will be readily apparent that with a jar thus constructed the acid will be prevented from getting inside of the metal case and will not act upon the edge of the jar since the latter is constituted by the annular rim 6.

Having thus described the invention, what is claimed as new is:

In a jar for storage batteries, the combination of an outer shell, an inner shell formed of hard rubber and fitting within the outer shell, the said inner shell being provided at its mouth with an enlarged annular rim also formed of hard rubber and extending over and resting upon the edge of the outer shell, and a lip of soft rubber pendent from the enlarged rim and overlapping the edge of the outer shell upon the exterior thereof.

In testimony whereof I affix my signature in presence of two witnesses.

JOSEPH MARX. [L. S.]

Witnesses:
　ROY C. A. MATTHEWS,
　MARY MARX.